3,497,552
CONTINUOUS CRYSTALLIZATION IN A PLURALITY OF COOLING STAGES USING DILUTIONS BY COOLED SOLVENT OF FEED TO EACH STAGE
George P. Olsen, Whiting, Ind., assignor to Standard Oil Company, Chicago, Ill., a corporation of Indiana
No Drawing. Filed July 18, 1966, Ser. No. 565,674
Int. Cl. C07c 51/42, 63/26
U.S. Cl. 260—525  4 Claims

ABSTRACT OF THE DISCLOSURE

Purification of impure organic compounds sparingly soluble in water at 100° C. having as impurity one or more compound 5 to 10 times more soluble at 100° C. than sparingly soluble organic compound with content of such impurity not exceeding impurity solubility in water at 95 to 110° C. when all of the sparingly soluble impure compound is dissolved in liquid water at 150 to 300° C. substantially at its saturation concentration can be accomplished by continuous crystallization in a plurality of series connected cooling stages each having a receiving zone, recycle loop for withdrawal of aqueous mixture from lower portion of receiving zone and for discharge of aqueous mixture into the upper portion of the receiving zone and a separate liquid phase water injection.

In each recycle cooling loop there is combined three flowing streams consisting of said injected water, a feed stream and stream withdrawn from the lower portion of said receiver and the flow relationship of each of these streams are that the water in said withdrawn stream is 3 to 20 times the water in the feed stream and the injected water is sufficient to provide the cooling required for each stage. The crystallized product recovered from the last stage is the sparingly soluble organic compound having less of the starting impurity.

---

This invention relates to a technique for crystallizing from solution an organic compound solute soluble to the extent of no more than 1.0 part by weight per 100 parts by weight of solvent at 200° to 212° F. (about 100° C.) without evaporating or otherwise removing solvent and without shock cooling of the solution of said aromatic acid solute. It more particularly pertains to crystallization of said solute by dilution of its solution through additional solvent added at a temperature lower than that of the solution before dilution, but in an amount of added solvent substantially less than that required by an enthalpy balance with respect to both solution temperature before dilution, temperature of added solvent, and temperature of the resulting dilute solution. That is the crystallization process of this invention permits the use of colder added solvent than would be possible by just mixing the two streams.

There are many organic chemical compounds sparingly soluble in most solvents, 1.0 part or less per 100 parts of solvent at temperatures up to 200° to 212° F. (about 100° C.). To purify such compounds by means involving treating solutions of them and then recovering the purified solute as a crystalline product requires the use of solution temperatures well above 100° C., e.g. in the range of 150 to 300° C. (300 to 570° F.). These temperatures are used so the sparingly soluble solute treated and the volume of solution handled are commercially feasible. In many cases the sparingly soluble solute has associated therewith one or more impurities many times more soluble than the sparingly soluble solute to be purified. However, such impurities cannot be kept in solution while the sparingly soluble solute is being crystallized by usual means, such as evaporative cooling achieved by flashing off solvent from the pressure required to maintain the solvent in the liquid phase at said 300 to 570° F. temperature range to some lower pressure and temperature.

Terephthalic acid is a case in point. This phthalic acid isomer is sparingly soluble in most of the common solvents at temperatures up to 200 to 250° F. Only within the past 10 years has terephthalic acid been available in commercial quantities for non-captive use, that is use by other than the direct manufacture of this phthalic acid isomer. The principal use of captive and non-captive terephthalic acid is and has been for the manufacture of high molecular weight polyesters or superpolyesters for film and fiber manufacture under various trade names and trademarks throughout the world. Terephthalic acid for such use must be of a purity of 99 mole percent or higher. It has only been available in such purity commercially for the preparation of said film and fiber forming superpolyesters substantially only through its dimethyl ester purified through recrystallization and/or fractional distillation techniques. The acid itself, not so purified by commercially feasible means, can be used in place of its purified ester. The improvement provided by this invention makes available a recovered purified terephthalic suitable for such use.

Many routes exist for the production of crude terephthalic acid from readily available xylene, either p-xylene or mixed xylenes. For example p-xylenes can be oxidized by catalytic liquid phase oxidation with molecular oxygen (e.g. air), or by nitric acid, or by a modified Willgerodt oxidation, i.e. the reaction of p-xylene with ammonia and sulfur. Another route to terephthalic acid is through the disproportionation and/or isomerization of salts of benzoic acid and/or mixtures of phthalic acid isomers or o-phthalic acid. These benzoic carboxylic acids can be obtained by the foregoing oxidations, or by the controlled partial vapor phase oxidation of naphthalene or o-xylene. In any event, terephthalic acid first recovered from the foregoing processes is less than 99 percent pure and must be subjected to some purification process. Some purifications of terephthalic acid per se selectively convert impurities inherently produced as oxidation co-products to different compounds. The main object of those purifications was to convert said oxidation co-products to different chemical entities having lower boiling points and/or higher solubilities than that of terephthalic acid. It was thought that to do so would simplify the purification for obtaining terephthalic acid of a purity of at least 99 percent.

However, such precursor treatments for purifying terephthalic acid obtained by liquid phase oxidations of dialkylbenzene with nitric acid or molecular oxygen or by disproportionation and/or isomerization of benzene carboxylic acids while accomplishing the change of one or more impurities into one or more different chemical entities of lower boiling points and/or higher solubility, did not simplify the final purification step of recovering purified terephthalic acid. For example, crude terephthalic acid obtained by the nitric acid liquid phase oxidation of p-xylene is contaminated with nitro derivatives of terephthalic acid, p-toluic acid, 4-formyl (or aldehydo) benzoic acid and other nitro aromatic compounds. One purification suggested for such impure terephthalic acid proceeds first through reduction of nitro compound impurities to amino compounds while the impure terephthalic acid or one of its water soluble salts are dissolved in water. Terephthalic acid is then precipitated either by cooling the aqueous solution of solute terephthalic acid or by acidification if the water soluble terephthalate is the solute. Such precipitations are so conducted to leave dissolved in the solvent water the closely related more soluble amino impurities. However, apparently impurities still contaminate the recovery crystallized terephthalic acid for it is then subjected to additional purification, for example by converting it to a distillable form such as its dimethyl ester and fractionating the ester.

Another purification of crude terephthalic acid, such as from the catalytic air oxidation of p-xylene or other p-dialkylbenzenes that contain partial oxidation products, such as p-toluic acid, 4-formylbenzoic acid, p-cumic acid, or p-acetylbenzoic acid, proceeds through reduction of the formyl or acetyl group with a bisulfite or hydrogen while the crude terephthalic acid is dissolved in water. Even though the partial oxidation products are selectively converted to alkyl substituted benzoic acids which are many more times soluble in water than terephthalic acid is, the dissolved terephthalic acid recovered by ordinary crystallization is still contaminated with reduction process products.

The disproportionation and isomerization of potassium benzoate or isomerization of potassium salts of a mixture of phthalic acid isomers or o-phthalic acid followed by dissolving potassium terephthalate in water and precipitating free crystalline terephthalic acid by acidification of the aqueous solution of potassium salts can produce impure terephthalic acid. For example some benzaldehyde present in benzoic acid subjected to disproportionation and isomerization is converted to 4-formylbenzoic acid. Impurities present in o-phthalic acid or its anhydride are to some small extent converted to carboxylic acids that appear as contaminants in the recovered free terephthalic acid. Some of the contaminants may be on the surface of the terephthalic acid crystals; a substantial portion, enough to be slightly over one per cent, will be occluded in the terephthalic acid crystal. By subjecting the recovered crystalline terephthalic acid to several (e.g. 3 to 5) recrystallizations from water the impurity level may be reduced to less than one percent. However, the number of additional recrystallizations necessary to obtain 99.9 percent pure terephthalic acid are sufficiently great as to make such a purification route not commercially feasible.

The crystallization process of this invention is useful for the recovery of purified terephthalic acid produced by the before mentioned purifications of crude terephthalic acids without regard to the sources of the crude acid.

The crystallization route of this invention is applicable, in general, to the recovery of organic compounds sparingly soluble (one percent or less) in water at 100° C., where the impurities have greater solubilities in water at 100° C., desirably 5 to 10 and even up to 100 times greater, than the compound to be purified and the impurities are present in an amount less than that required to exceed saturation of the water at 95 to 110° C. The process of this invention is especially useful for the recovery of terephthalic acid of a purity of 99.9 percent and higher from terephthalic acid contaminated with p-toluic acid in such amounts as preferably 200 to 5000 parts per million (p.p.m.), desirably 200 to 10,000 p.p.m. and suitably up to 15,000 p.p.m. (1.5 weight percent). The process of this invention can be used to separate substantially pure, e.g. 99.9 to 99.99 weight percent, terephthalic acid from an impure terephthalic acid containing up to about two percent p-toluic acid. Such an impure terephthalic acid results from the nitric acid oxidation of p-toluic acid which in turn was obtained by liquid phase air oxidation of p-xylene, or from the nitric acid oxidation of p-xylene, or from the liquid phase oxidation of dialkylbenzenes such as p-xylene, p-cymene, p-ethyltoluene, or from partially purified terephthalic acids from other processes wherein their impurities are either converted to p-toluic acid acid or the original p-toluic acid content was in some way, e.g. water extraction, reduced to about 0.2 to 2 percent. The process of this invention can also be used to obtain terephthalic acid of 99.9 to 99.99 weight percent purity from terephthalic acid contaminated with more than about 2 weight percent, e.g. up to 5 to 10 weight percent or more, p-toluic acid but such greater amounts of p-toluic acid can be readily lowered to about 2 mole percent by one or two water extractions at elevated temperatures.

The process of this invention in its broadest concept is applied to crude organic chemical compounds having water solubility of one percent by weight or less at 100° C. and increasing in solubility with temperature to within the range of 10 to 30 weight parts per 100 parts of water at 300° C. and having present in the crude organic chemical compound to be purified impurities having solubilities in water at 100° C. 5 to 10 times and even 5 to 100 times greater than the organic compound to be purified in amounts not exceeding their saturation concentration in water at 90 to 110° C. Basically, the process of this invention operates on an aqueous solution at 200 and 350° C. and pressure to maintain a liquid phase of water containing all of the sparingly soluble organic compound to be purified in solution at that temperature range, preferably at a concentration such that the water is saturated at about 10° C. lower than the solution temperature and free from materials not soluble in water at 200 to 350° C. Such a solution is charged to a first receiving vessel at the rate of L weight parts water per unit of time. The contents in the first receiving vessel are withdrawn from and circulated in a first recycle loop external to said first receiving vessel at a rate of 5 to 10L weight parts water per unit of time therefrom and back thereto. Water at a temperature of from 90 to 120° C. is added thereto to obtain a temperature of resulting diluted solution between saturation and super saturation with respect to the compound being purified so that the original solution is cooled rapidly and the temperature of the first dilute solution does not result in crossing the temperature-solubility equilibrium curve into a region known as the labile region. Thereafter the first diluted solution is charged to a second receiving vessel at a water rate equal to L plus the weight parts per unit of time of water at 90° to 120° C. added in the loop external to the first receiving vessel. The contents of the second receiving vessel are circulated into second recycle loop external to the second receiving vessel at a rate of 5 to 10L weight parts of water per unit of time from said vessel. There is added to the solution cycling in said second recycle loop water at a temperature of from 10° to 70° C. in an amount to reduce the temperature of the composite aqueous mixture to 90 to 110° C. The second diluted solution discharges back into the second receiving vessel. In this manner a temperature is reached to provide recovery of the sparingly soluble organic compound as a purified substantially completely crystallized product.

Such starting aqueous solutions of the impure organic compound to be recovered as purified product by the crystallization process of this invention can result from a high temperature and high pressure prior purification that converts one or more by-product impurities from reactions producing the sparingly soluble organic compound to chemical entities differing from said by-product impurity in water solubility and/or boiling point. Also, such solutions can result from dissolving the crude sparingly soluble organic compound previously recovered directly as a solid reaction product in water liquid at 200 to 300° C. in an amount of it to dissolve all of the compound to be purified.

By the crystallization process of this invention flashing of water solvent is avoided, flash cooling is avoided, relatively low process temperatures are employed, there is no flashing across valves and other pressure reducers or controlling devices to cause plugging by substantially instantaneous solid precipitation, and colder added water can be used than can be used when a simple mixing of a water stream and solution stream is used.

To demonstrate the uniqueness of the process of this invention with respect to only one of its applications the following illustrations are given.

The problem is to recover terephthalic acid from an aqueous solution having on the basis of 80 parts water, 20 parts terephthalic acid contaminated with 1000 p.p.m. p-toluic acid. All parts are on a weight basis. Such a solution must be formed at 520° F. (271° C.) and 985 pounds per square inch gauge (p.s.i.g.) pressure. To recover substantially all of the dissolved terephthalic acid by crystallization, the resulting aqueous solution must be cooled to about 220° F. (104° C.) and 2 p.s.i.g. pressure. But the recovered terephthalic acid must be substantially free from p-toluic acid. At 220° F. water saturated with respect to p-toluic acid contains 0.70 part p-toluic acid per 100 parts water or about 7000 p.p.m. on a weight basis. Thus, the foregoing solution has more than enough water to keep all the p-toluic acid in solution at 220° F. One crystallization method that might be used to solve the problem is to flash the solution from 520° F. and 985 p.s.i.g. to about 2 p.s.i.g. to achieve cooling to 220° F. with removal of 38–40% of the water originally present. This would still provide at 220° F. about 4 times the water theoretically required to keep the p-toluic acid in solution. However, by such a flash cooling, a substantial portion, about one-half to two-thirds, of the p-toluic acid actually is found occluded in the recovered crystallized terephthalic acid product. By a second method to solve the problem, the aqueous solution is cooled from 520° F. and 985 p.s.i.g. without flashing or water removal to below 390° F. followed by flash cooling to 220° F. This method results in about the same substantial occlusion of p-toluic acid in the terephthalic acid crystals as above described. Thus the crystallization techniques first to come to mind are not useful.

With the knowledge that crystallization must adhere as closely as possible to the super saturated region, the plot of both solubility and super solubility of terephthalic acid in water as a function of temperature on rectangular coordinates, indicates the desired crystallization path. To operate in such a manner as to enter the labile region, i.e. cooling to a temperature below that for super saturation with respect to terephthalic acid, causes occlusion of the more soluble p-toluic acid even though p-toluic acid concentration is nowhere near saturation or super saturation with respect to its solubility. Batch crystallization can readily be operated by careful temperature regulation to closely follow the solubility curve and not enter the labile region. But to determine by theoretical means the number of solvent dilution stages required for continuous crystallization, a plot of material and energy balances for each stage gives substantially straight lines on the rectangular coordinate plot of percent solubility as a function of temperature. Since the crystallization should closely follow the super solubility of the plot, these material and energy balance operating lines should closely follow the equilibrium and super solubility curves. Examination of the solubility curves on rectangular coordinates shows that it can be closely approximated by two straight lines. One closely follows the solubility curve at high temperatures, about 400° F. and above, and the other closely follows the solubility curve at temperatures below 400° F. If these two straight line solubility approximation lines are used as operating lines for a two stage solvent dilution crystallization, the intersection of the two lines at about 400° F. indicates that the first is possible with cooling to 400° F. and the first stage should be operated at 400° F. with the second stage at about 220° F. However, flashing the feed solution at 520° F. and 985 p.s.i.g. to 400° F. and pressure to maintain water in the liquid phase at 400° F. to a first stage and then flashing the 400° F. slurry to 220° F. and the pressure to maintain water in the liquid phase at 220° F. across valves with the aid of colder water injection into each stage receiving vessel still provides crystalline terephthalic acid with a substantial amount of p-toluic acid because such flash cooling produces shock cooling (substantially instantaneous precipitation) at or near the discharge side of the valve.

A two stage continuous crystallization system is possible wherein close adherence to the solubility-super solubility curves can be practiced and any shock cooling is avoided. For example, an aqueous solution of terephthalic acid at 520° F. and 985 p.s.i.g. is mixed with water no cooler than 30° F. below the temperature of the first stage 400° F. and then the first stage effluent is mixed with water no cooler than 30° F. below the second stage temperature. That is 370° F. water is mixed with said feed solution before it enters the first stage and 190° F. water is added to the first stage effluent before it enters the second stage. Pressures of 900 p.s.i.g. and 250 p.s.i.g. are maintained in the first and second stages respectively also to minimize shock cooling. When to this mode of operation there is used a feed solution at the rate of L pounds water per hour at 520° F. and 985 p.s.i.g. the amounts of water in pounds per hour (X) to be added to the feed solution before the first stage and (Y) to be added to the effluent from the first stage being charged to the second stage are calculated from a water enthalpy balance in terms of L. By such a calculation X is 4.25 L pounds water per hour, Y is 32.76L pounds water per hour and the total water added is then 37.01L water pounds per hour. Thus a highly impractical total amount of added water is required to be injected and transferred during processing.

By following the crystallization technique of this invention which involves water injection to a recycle stream flowing in a loop external to each stage, cooling for crystallization takes place in the external loop as water is injected therein and the first stage and second stage vessels are used as surge tanks or sumps for their respective external recycle loops. To use the 400° F. and 900 p.s.i.g. conditions in the first stage and 220° F. and 250 p.s.i.g. in the second stage to minimize shock cooling, lower amounts of water injection before each stage vessel can be used provided that high rates of circulation in each external loop are maintained because colder water can be used without deviating from the desired operating lines, i.e. those following closely the solubility curves. These circulation rates can be related to the rate of continuous feed of the original solution from which the sparingly soluble product is to be crystallized for recovery. Where L pounds per hour of water are in said feed solution to be continuously fed into the crystallization process of this invention, the rates of circulation in each of the recycle loop for each stage are based on the water in the effluent withdrawn from each stage, suitably at 2L and above, desirably in the range of 3L to 20L and preferably in the range of 5 to 10L pounds per hour. In each case the units of L are pounds of water per hour. At high rates of circulation in the external recycle loops the ratio of colder injected water to water circulating is quite low at the instant of contact and no shock cooling results provided that good mechanical mixing of the streams is effected.

A specific illustrative case for the mode of operation according to this invention involves the use of said aqueous solution of terephthalic acid (25 parts per 100 of water) containing 1000 p.p.m. p-toluic acid at 520° F. and 985 p.s.i.g. in a continuous 2 stage crystallization of terephthalic acid. Such a solution is charged at L pounds of water per hour. Equal withdrawal from each stage vessel of 8L pounds water per hour is maintained to provide high rates of circulation in each external recycle loop although these rates of withdrawal need not be the same. Aqueous terephthalic acid slurry is withdrawn from the first stage vessel operated at 400° F. and 900 p.s.i.g. at 8L pounds water per hour, combined with 210° F. water at 0.7L pound per hour and L pounds water per hour of said solution at 520° F. and 985 p.s.i.g. Thus the circulation rate up to the point of injecting 210° F. water is 8L, after said water injection is 8.7L and after mixing with the solution is 9.7L pounds per hour. Water enthalpy balance between feed solution, injected water and slurry at equilibrium in the first stage vessel shows that the injection of 0.7L 210° F. water per hour will maintain the 400° F. first stage temperature.

The second stage feed is (9.7L−8.0L)=1.7L pounds per hour of first stage effluent at 400° F. and 900 p.s.i.g. and is added to 8L pounds per hour aqueous slurry at 220° F. and 250 p.s.i.g. from the second stage after injecting 2.12L pounds per hour 70° F. water into the second stage external recycle loop. Thus the flow in the second stage external recycle loop is 8L pounds per hour of slurry at 220° F. and 250 p.s.i.g. 10.12L pounds per hour after injection of the 70° F. water and 11.82L pounds per hour to the second stage vessel after combining with the 1.7L effluent from the first stage vessel. A water enthalpy balance between the 1.7L first stage effluent, the 2.12L water at 70° F. and the second stage slurry at equilibrium at 225° F. and 250 p.s.i.g. demonstrates that the 2.12L pounds per hour 70° F. water will maintain the 220° F. second stage temperature. Washed and dried terephthalic acid of above 99.9 percent purity can be recovered by filtration, centrifugation or other means for separating solids and liquids of the second stage effluent.

The total water injected in the foregoing illustrative mode of operating the crystallization process of this invention is only 2.82L. This is far more feasibly handled in a commercial continuous process than the 37.01L higher temperature water injection direct into feed transfer lines between original solution source to first stage crystallizer and first stage effluent transfer feed to the second stage crystallizer using 370° F. and 190° F. water injection. The lack of shock cooling when using the 210° F. water at 0.7L and 70° F. water at 2.12L with the high rates of circulation in the external recycle loops cannot be accounted for by using the summation of effects of circulation rates and enthalpy balances to arrive at an equivalence between this technique and the technique of preventing shock cooling by direct addition of water slightly cooler than the original feed and the effluent from the first stage crystallizer to the second stage crystallizer operated at the same conditions of temperature and pressure as the surge or sump vessels for the external first and second stage recycle loops.

By using recycle withdrawal rates above 8L as feed rates to one or both of the external recycle loops in the foregoing illustrative mode of operation according to the inventive concept of this invention, injection water of even lower temperature and thus less total water injection can be used. In general, water temperature of 210° F. is readily and easily obtainable in chemical process commercial operations by using low pressure steam resulting from water cooling of reaction processes or by indirect heat exchange between hotter process streams or non-water liquid cooling streams. In the above case by recycle of a portion of the total 3.82L pounds per hour mother liquor at 220° F. after a purge of 1.0L pound per hour to supply the 0.7L pound per hour 210° F. water as well as the 2.12L pounds per hour 70° F. water using raw well water at 55° F. to provide cooling of the recycle stream in two stages without having to treat the raw well water in any way to prevent contamination of chemical products being produced and recovered. Likewise 70° F. water can be readily obtained through the use of cooling towers even during the hotter portions of the year. Hence, for the purposes of utilizing the crystallization technique of the process of this invention injection water in the temperature range of 55 to 220° F. are readily obtainable and thus their use are a matter of economic choice.

The crystallization process of this invention is not limited to the crystallization and recovery of terephthalic acid of high purity although its use therefor is exceptionally advantageous. The process of this invention can be used to crystallize any organic chemical compound which is solid at ambient temperature to 210° F. and sparingly soluble at the boiling point of water at ambient atmospheric pressure. When such organic chemical compounds also contain completely water insoluble impurities (insoluble up to the critical point of water) filtration of the solution from which the product is to be crystallized or some other treatment prior to carrying out the crystallization process of this invention, is of course necessary.

The process of this invention need not be carried out by the use of only two stages for it can be carried out with a plurality of stages as a matter of choice or as the solubility v. temperature curve of the particular compound to be recovered indicates when taken into account as hereinbefore described.

The crystallization technique of this invention is illustrated by the following Examples.

EXAMPLE 1

The crystallization technique of this invention is carried out starting with an aqueous solution of terephthalic acid at 520° F. and 985 p.s.i.g. having 30 pounds dissolved terephthalic acid per 100 pounds of water and 600 parts per million p-toluic acid based on the solution (2600 p.p.m. based on terephthalic acid). Three stirred series connected closed receiving vessels are used. The first is at 900 p.s.i.g. and 400° F., the second is at 250 p.s.i.g. and 220° F. and the third is at 220° F. and 2 p.s.i.g. Connected to each of the first two vessels is a pumped slurry recycle loop which withdraws aqueous slurry of terephthalic acid crystals from the bottom of the vessel to which it is connected and discharges slurry through the top of the vessel into the liquid therein. The first vessel is connected to the second vessel by a conduit having a pressure reducer. Slurry from the first vessel is withdrawn below the liquid level therein maintained and discharged into the slurry flowing in the second slurry recycle loop. The second and third vessels are connected by a conduit-pressure reducer which withdraws slurry from the second vessel below its liquid level and discharges below the liquid level in the third vessel.

The 520° F. and 985 p.s.i.g. aqueous terephthalic acid solution is fed into the first slurry recycle loop at the rate of 130 pounds per hour (100 pounds per hour of water). Water at 210° F. and 985 p.s.i.g. is also fed into the first slurry recycle loop at 70 pounds per hour downstream from the pump discharging slurry at a rate of 800 pounds water per hour and just prior to the introduction of aqueous terephthalic acid solution. The composite discharge from the first recycle loop into the liquid in the first vessel is at 400° F. and 900 p.s.i.g.

There is withdraw from the first vessel and discharged into the second slurry recycle loop per hour an amount of slurry at 400° F. and 900 p.s.i.g. containing 212 pounds water per hour. Between the point of introduction of said slurry into the second slurry recycle loop and its pump discharging second vessel slurry at a rate of 800 pounds water per hour, there is introduced 212 pounds water at 70° F. and 250 p.s.i.g. The composite slurry discharged below the liquid level in the second vessel is at 220° F. and 250 p.s.i.g.

There is withdrawn from the second vessel per hour an amount of slurry having 382 pounds water and this is discharged below the liquid level in the third vessel maintained at 220° F. and 2 p.s.i.g. There remains in solution 0.04 pound terephthalic acid per 100 pounds water at 220° F. This slurry in the third vessel is fed to centrifuges continuously to separate terephthalic acid crystals from the aqueous solvent. The terephthalic acid centrifuge cake is washed with water and then dried.

In the foregoing manner dried terephthalic acid may be recovered in yields of 99.5% based on the terephthalic acid originally present in the 520° F. and 985 p.s.i.g. feed solution. The p-toluic acid content of the dried terephthalic acid is in the 90 to 120 p.p.m. range. Thus a separation factor in the range of 22 to 29 is achieved. By "separation factor" is meant the ratio of original p-toluic acid present to that in the recovered and dried terephthalic acid product.

In contrast the separation factor from flash cooling from 520° F. and 985 p.s.i.g. to 220° F. and 2 p.s.i.g. gives a separation factor of about 2.0 and rapid cooling from 520° F. to 380° F. and then to 220° F. at 4 to 5° F. per minute still gives a separation factor below 5.

EXAMPLE 2

Using the system similar to that of Example 1 except the discharge from the second vessel is to the centrifuges, there is used as feed acid per 100 pounds water at 520° F. and 900 p.s.i.g. There is also present 1600 p.p.m. p-toluic acid based on the terephthalic acid. The operating conditions are as follows, where "TA" is terephthalic acid:

| Stream, description | Tempera-ture, °F. | Pressure, p.s.i.g. | Water | TA | |
|---|---|---|---|---|---|
| | | | | Solid | Dissolved |
| Feed solution | 520 | 900 | 24 | None | 6 |
| First slurry loop quench water | 210 | 850 | 21 | None | None |
| First vessel discharge | 400 | 850 | 45 | 5.0 | 1.0 |
| Second slurry loop quench water | 80 | 250 | 32 | None | None |
| Discharge to centrifuge | 280 | 35 | 77 | 5.88 | 0.12 |

This operation recovers 98% of the terephthalic acid in the feed solution with a p-toluic acid content in the range of 50 to 100 p.p.m., i.e. a separation factor in the range of 30 to 16.

What is claimed is:

1. A method of purifying impure terephthalic acid whose principal impurity is p-toluic acid present in amounts not exceeding its solubility at 95 to 110° C. in water, which method comprises dissolving said impure terephthalic acid at 150 to 300° C. in a liquid phase of water in an amount to provide a solution substantially saturated with terephthalic acid at a super-atmospheric pressure at least equal to water vapor pressure 10° C. above saturation temperature and continuously cooling said solution in a plurality of series connected cooling zone stages each having a receiving zone and recycle loop for withdrawing aqueous mixture from the lower portion of the receiving zone and discharging into the upper portion of the receiving zone by a separate liquid phase water injection for each stage with each water injection at a different lower temperature to provide a final cooling stage temperature not below the range of 95 to 110° C., each cooling stage being conducted by continuously combining in the recycle loop external to each receiving zone three flowing liquid streams consisting of said injected water, a feed stream and a stream withdrawn from the lower portion of the receiving zone wherein said recycle loop the ratio of water in said flowing withdrawn stream is in the range of 3 to 20 times the water in said feed stream and the water added by injection provides the cooling required for that cooling stage, the feed stream for the first cooling stage is the liquid phase aqueous solution at 150 to 300° C. and the feed stream for each subsequent cooling stage is the dilute cooled aqueous mixture produced in the preceding cooling stage, the pressure of the water injected in each stage is at least equal to the pressure of the feed to each stage so that no flash vaporization of water occurs upon transfer of feed to each cooling stage; and recovering purified terephthalic acid as a crystalline solid from the mixture in the receiving zone in the last cooling stage.

2. The method of claim 1 carried out in two cooling zone stages wherein both stages the rate of water flow of both withdrawn streams circulating in both external recycle loops is 5 to 10 times the water flow of both feed streams and the first injected water is at a temperature in the range of 90 to 120° C. and the second injected water is at a temperature in the range of 10 to 70° C 3. The method of claim 2 wherein the first feed stream is a liquid phase aqueous solution of terephthalic acid having p-toluic acid as an impurity in an amount of 500 to 6000 p.p.m. and the final temperature in the second stage is in the range of 130 to 150° C.

4. The method of claim 3 wherein the first injected water is at a temperature of about 100° C. and the second injected water is at a temperature of about 26° C. and the second stage final temperature is about 138° C. and a pressure of 35 p.s.i.g.

References Cited

FOREIGN PATENTS 1,341,674  9/1963  France.

LORRAINE A. WEINBERGER, Primary Examiner

R. S. WEISSBERG, Assistant Examiner